United States Patent [19]
Smith

[11] 3,840,020
[45] Oct. 8, 1974

[54] ELECTRIC FIELD PROPAGATING GRID FOR INDUCING BENEFICIAL PHYSIOLOGICAL EFFECTS IN ANIMALS

[75] Inventor: Lawrence B. Smith, Leesburg, Va.

[73] Assignee: Bioelectric Systems, Inc., Leesburg, Va.

[22] Filed: Feb. 2, 1973

[21] Appl. No.: 328,899

[52] U.S. Cl............................ 128/404; 317/262 AE
[51] Int. Cl............................................. A61n 1/12
[58] Field of Search..... 128/413, 404, 419 R, 172.1, 128/362, 303.13, 190; 55/150–152, 146–147, 138, 2, 101; 317/4, 262 AE; 21/74 A; 250/532

[56] References Cited
UNITED STATES PATENTS

| | | | |
|---|---|---|---|
| 1,014,719 | 1/1912 | Pennock | 317/262 AE |
| 2,158,415 | 5/1939 | Formhals | 317/4 X |
| 2,708,980 | 5/1955 | Hull | 55/147 X |
| 2,987,137 | 6/1961 | Brixius et al. | 55/138 |
| 3,234,432 | 2/1966 | Streib | 317/262 AE |
| 3,483,672 | 12/1969 | Jahnke | 128/419 R |
| R27,027 | 1/1971 | Cristofv et al. | 128/190 |

FOREIGN PATENTS OR APPLICATIONS

| | | | |
|---|---|---|---|
| 919,338 | 2/1963 | Great Britain | 128/419 R |

*Primary Examiner*—Richard A. Gaudet
*Assistant Examiner*—Lee S. Cohen
*Attorney, Agent, or Firm*—Berman, Bishoff & Platt

[57] ABSTRACT

A continuous wire grid is strung horizontally between two wooden poles which are suspended tautly between the walls of a horse stall, or other enclosure, much like a hammock. The grid is connected to a high voltage D-C power supply and the voltage potential on the grid creates an artificial electric field between the grid and the earth or floor of the stall or enclosure. This field replaces the strong positive electric field found in nature on sunny, clear days, but which is shielded out by structures, especially those of concrete and steel or having metal roofs.

7 Claims, 5 Drawing Figures

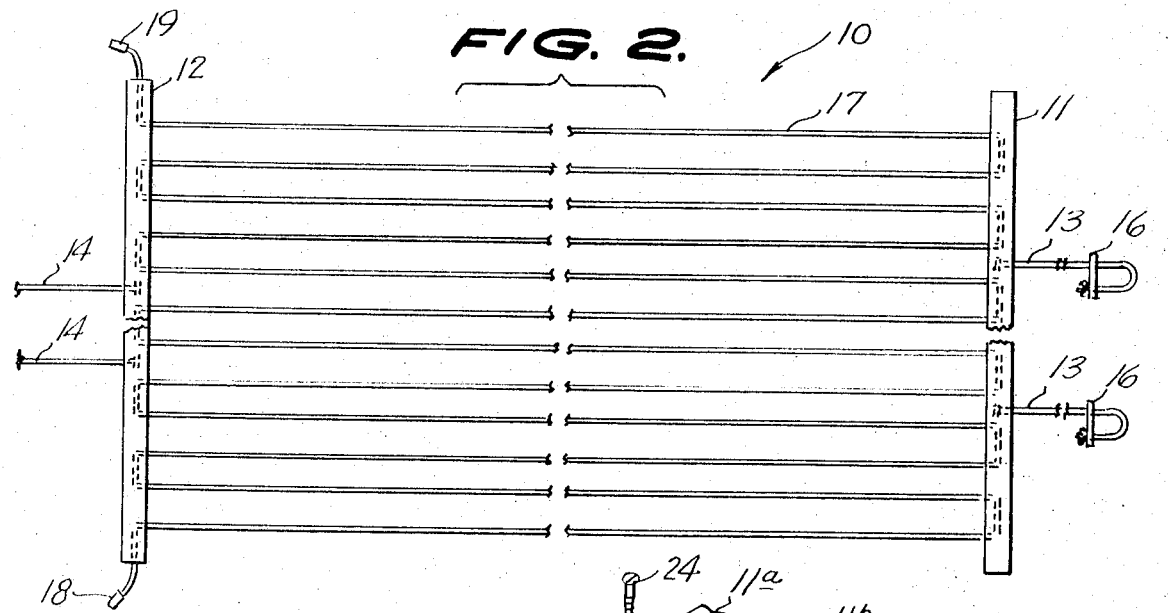
FIG. 2.
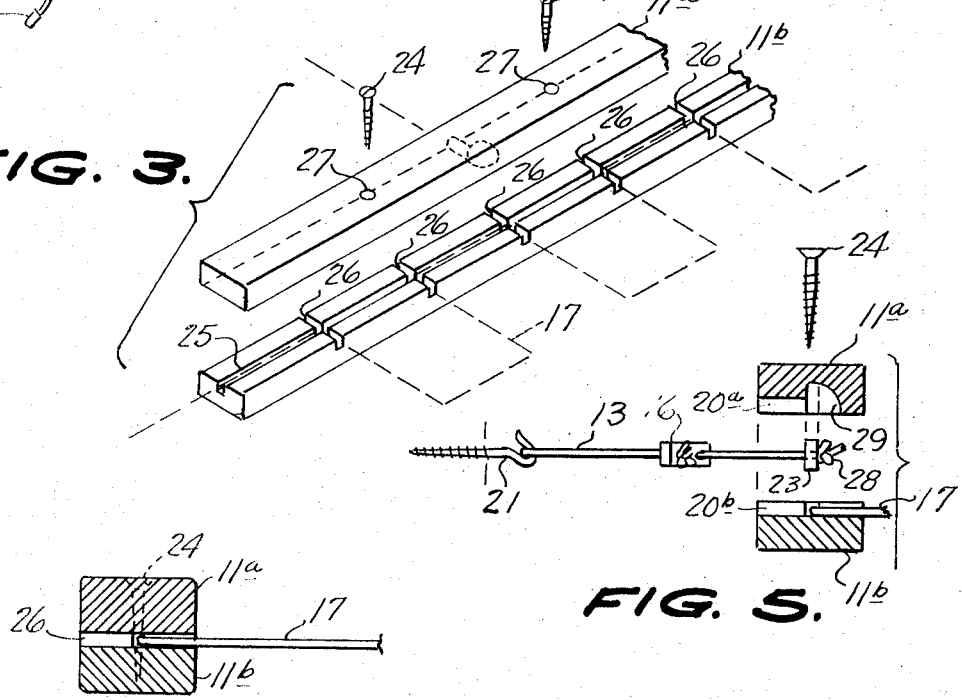
FIG. 3.
FIG. 5.
FIG. 4.

3,840,020

ELECTRIC FIELD PROPAGATING GRID FOR INDUCING BENEFICIAL PHYSIOLOGICAL EFFECTS IN ANIMALS

BACKGROUND OF THE INVENTION

This invention relates to wire grids for maintaining an electrical potential and more particularly relates to such a grid which is suspended over a horse stall, or other enclosure, for creating an electrical field in order to produce beneficial physiological effects in horses or other animals.

It has been shown that hypertense horses maintained in an electrical field receive important physiological benefits and are considerably, if not completely, calmed. The same results can be expected with other animals, including human beings. This effect has been described, for example, in U.S. Pat. No. Re. 27,027, issued to C. Cristofv et al., on Jan. 12, 1971.

There has been a need for apparatus which is capable of generating the desired electrical field, which is readily portable, easy to install, generates a homogenous electric field, which can be manufactured inexpensively from readily available materials, which is easy to clean and which does not restrict the circulation of air in the stall or other area of installation.

SUMMARY OF THE INVENTION

The primary object of the present invention is to provide a wire grid capable of sustaining an electrical field for the purposes described above and having the above-mentioned desirable characteristics.

This object is achieved in the present invention by providing a continuous wire grid strung in parallel rows between two end poles. The portions of the grid running perpendicular to the parallel rows are embedded in grooves provided in the end poles. Suspending ropes are attached near the center of each of the end poles and include tautening means for stretching the parallel wire rows tightly over the intended area of use. Means are provided for applying an electrical potential to the wire grid and further means are provided for attaching the end of the wire to a further grid, so that a plurality of grids may be operated from a single power supply.

BRIEF DESCRIPTION OF THE DRAWINGS

FIG. 2 is a top plan view of the grid of the present invention;

FIG. 3 is a perspective fragmentary exploded view of the supporting pole for the wire grid;

FIG. 4 is a transverse section taken on a supporting pole, showing the manner in which the wire is supported therein; and FIG. 5 is an exploded sectional view showing the manner in which the suspending means are attached to the support poles.

DETAILED DESCRIPTION OF THE INVENTION

Figure 1:
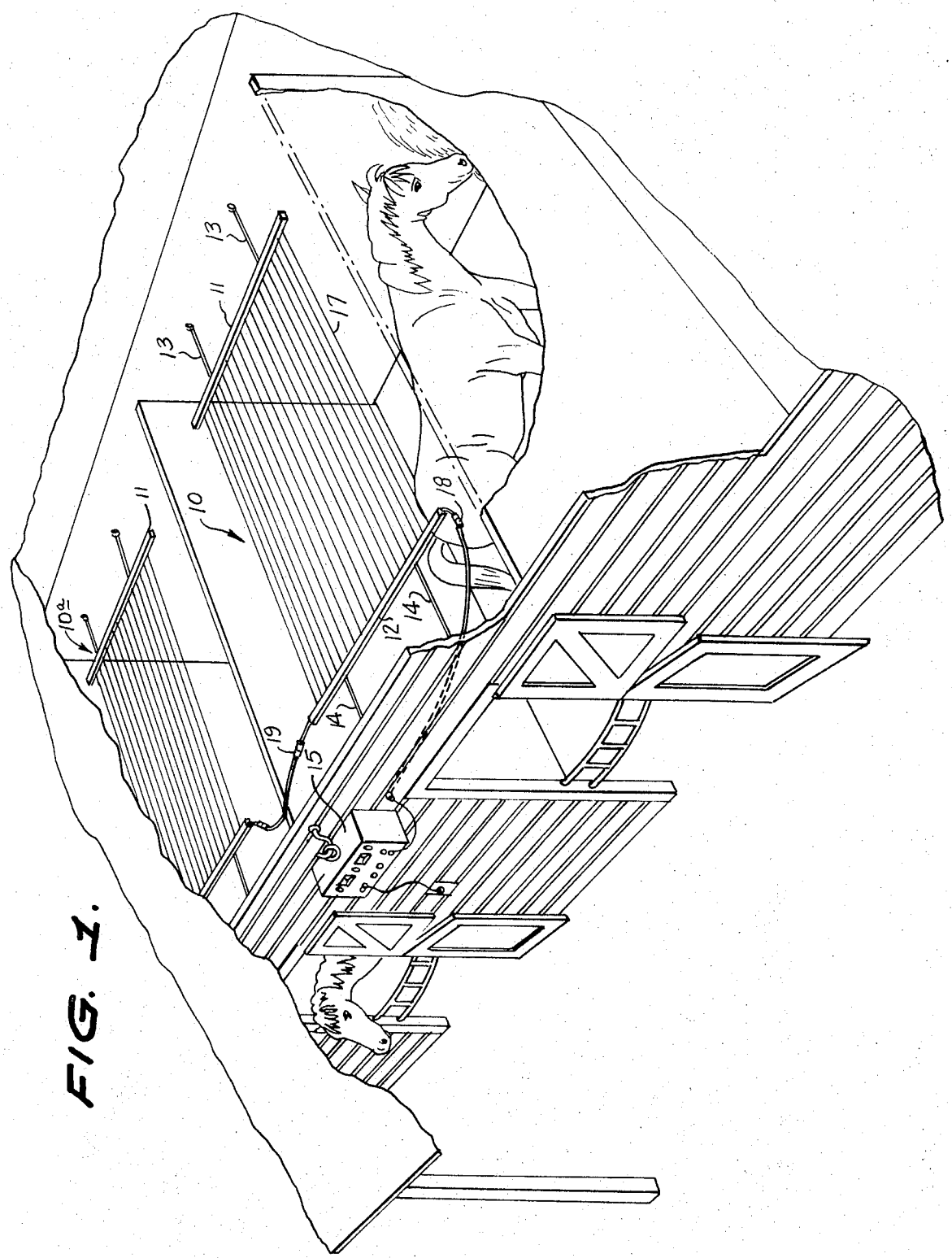
FIG. 1 is a perspective view showing the grid of the present invention installed in a horse stall.

Referring now to the drawings, there is shown the wire grid of the present invention, generally designated by the reference character 10. As can best be seen in FIGS. 1 and 2, the grid comprises a continuous wire 17 strung in parallel rows between rear end pole 11 and front end pole 12. The specific manner in which the wire 17 is secured to the poles will be described more fully hereinbelow.

As shown in FIG. 1, grid 10 is suspended from the front and rear walls of a horse stall directly over the area which the horse normally occupies. One end of the wire 17 is connected via connector 18 to power supply 15, while the other end of the wire 17 may be connected by means of connector 19 to a succeeding grid 10a. In this manner, a single power supply 15 may be utilized to supply as many grids connected in series as it can handle within its capacity.

Electrically, the grid acts like a capacitor and maintains a high voltage potential, in a preferred embodiment approximately 4 kilovolts, placed on it by the D.C. power supply. A suitable power supply is disclosed in U.S. Pat. No. Re. 27,027, issued to C. Cristofv et al. on Jan. 12, 1971.

As can be seen in FIGS. 1 and 2, rear end pole 11 is attached to the stable wall by suspending ropes 13, while front end pole 12 is attached to the front stable wall by suspending ropes 14. Each suspending rope is provided with a tent rope type slide fastener 16, so that when the grid has been suspended, the slide fasteners may be utilized to tauten the parallel rows of wire 17, insuring that they are uniformly arrayed in horizontal rows.

With reference now to FIGS. 3 and 4, it can be seen that each of the end poles (only rear end pole 11 being illustrated) is divided into two halves. Top half 11b contains longitudinal groove 25 and uniformly spaced transverse grooves 26 for receiving wire 17 in the manner shown and insuring that uniform spacing is maintained between the parallel rows of wire. The bottom half 11a is provided with screw holes 27 for receiving fastening screws 24, intermediate transverse grooves 26 in the manner shown in FIG. 4. Bottom half 11a maintains wire 17 in place and assures that the parallel rows of wire will retain the desired configuration.

With reference now to FIG. 5, the manner in which suspending ropes 13 and 14 are secured respectively to poles 11 and 12 and to the walls of the stable is illustrated. Since the fastening methods are identical with respect to ropes 13 and 14, only rope 13 is illustrated. As can be seen, the end of rope 13, attached to slide fastener 16, is formed in a loop configuration which is attached to mounting hooks 21. The other end of rope 13 is passed through a nut 23 and a knot 28 is formed in the end thereof to prevent slippage back through the nut. Nut 23 is placed in interior chamber 29 formed in bottom half 11a of end pole 11. Thus, when halves 11a and 11b are brought together and fastening screws 24, inserted through mounting holes 27 and tightened, as described above, nut 23 will prevent rope 13 from being removed from pole 11. In like manner ropes 14 will be securely fastened to end pole 12. Transverse passages 20, comprising lower half passage 20a and upper half passage 20b provide access to chamber 29 for the suspending ropes.

In a preferred embodiment of the invention, the grid is 7 feet across and 8 feet long to accommodate the average size stall which is about 10½ feet by 11½ feet. This leaves enough room at the sides or ends for a man to pitch or drop hay into a corner bin. In addition, it is important that safe clearance be maintained to prevent contact between the grid and adjacent metal beams or pipes.

The end poles 11 and 12 are seven feet long and approximately 1½ inches by 1½ inches with the edges and ends rounded off. Grooves 25 and 26 are three thirty-seconds of an inch deep and transverse grooves 26 are spaced 4 inches apart.

Screws 24 are brass since the ammonia gases emanating from the stall from such sources as urine and the like, present an especially corrosive environment.

Wire 17 is 18 gauge MIL-W-16878, tinned copper, Type D with Polyvinylchloride insulation. Stranding is nineteen-thirtieths of an inch. The advantage of this particular wire is its durability and flexibility since when the grid is transported from one stall to another, it is rolled up tightly. The PVC insulation is also resistant to acids, alkalis, moisture, solvents and fungus which, as indicated above, is necessary in the stall environment.

Channel 20, formed of upper channel half 20a and lower channel half 20b is one-eighth inch in diameter and accommodates top suspending ropes 13 and 14 formed of one-eighth inch nylon, 36 inches in length. Chamber 29 comprises a one-half inch hole, one-half inch deep and nut 23 is a one-fourth inch stovebolt nut (approximately one-half inch square).

There has thus been described an electric field supporting grid which fulfills the objects of the invention in being readily portable, easy to install, efficient in design and size for propagating a homogenous electric field, inexpensively manufactured from readily available materials, easy to clean from below with a broom, dust mop or the like, and which does not restrict air circulation in the stall.

While a preferred embodiment of the invention has been described, it will be readily appreciated by those skilled in the art that various modifications may be made therein without departing from the spirit and intent of the invention. It is, therefore, intended that the scope of the invention be defined only by the terms of the claims set forth hereinbelow.

I claim:

1. A portable wire grid capable of sustaining an electrical field for creating beneficial physiological effects in animals, comprising in combination:
   a. a front end pole;
   b. a rear end pole;
   c. a continuous conductive wire arranged in a regular geometrical pattern including a plurality of parallel rows and loosely suspended between said poles so that said poles and wire may be rolled up when not in use;
   d. means for suspending said grid over the area of intended use; and
   e. means for applying an electrical potential to said wire.

2. The grid set forth in claim 1, wherein said suspending means comprises means for tautening said plurality of parallel rows of wire.

3. The grid set forth in claim 1, wherein said geometrical pattern includes portions of said wire disposed at substantially right angles with respect to said parallel rows, said portions being embedded in said end poles.

4. The grid set forth in claim 1, wherein said suspending means comprises two lines attached to each of said poles and said tautening means comprises slide means on the lines.

5. The grid set forth in claim 4, wherein said front and rear poles are divided into a top and bottom portion, said portions being embedded in grooves provided in said top halves.

6. The grid set forth in claim 4, wherein said lines are attached substantially in proximity to the center of said poles to prevent bowing of the poles when said wires are tautened.

7. The grid set forth in claim 1, further including means for connecting said wire to a further grid.

* * * * *